Figure 1:
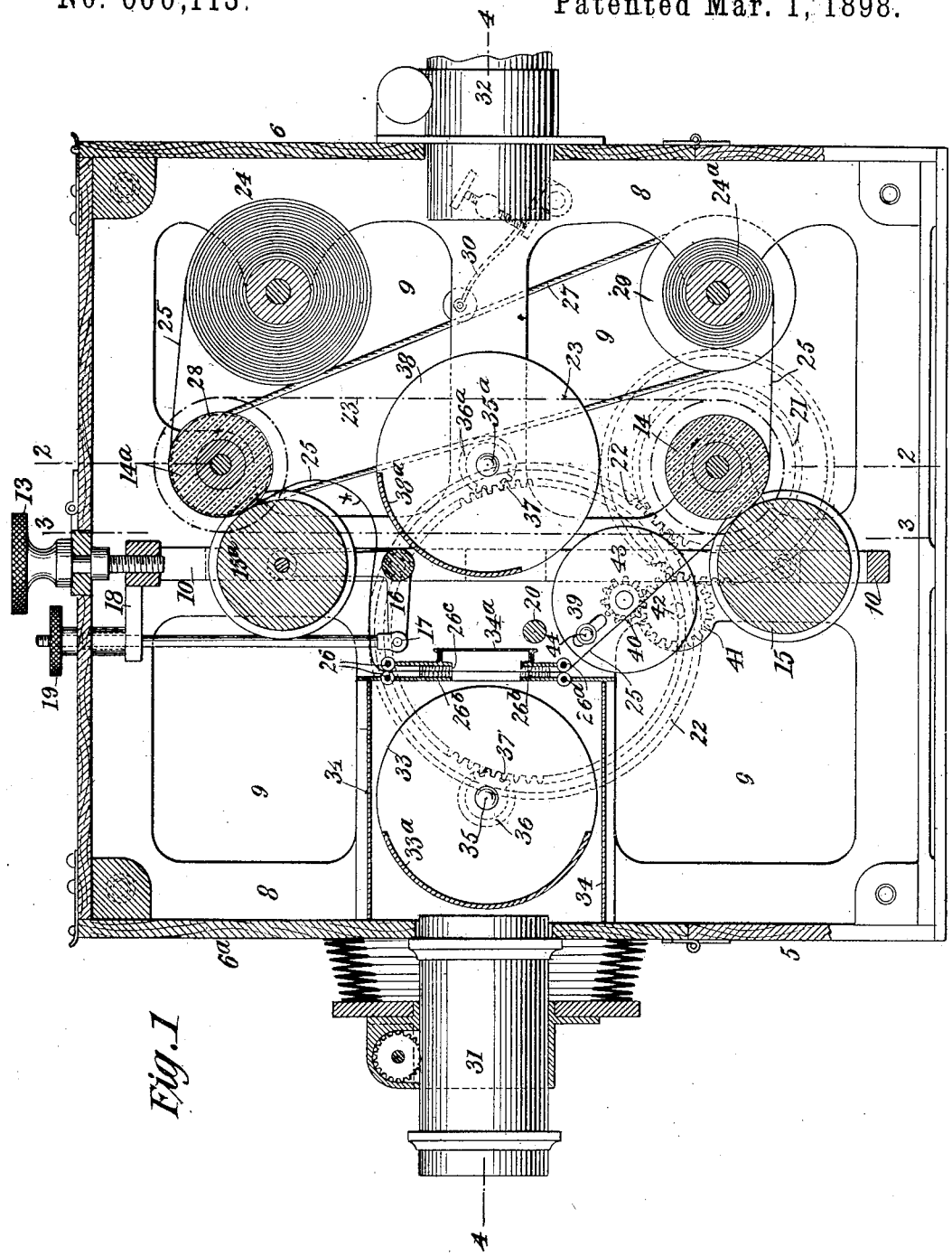

(No Model.)

W. LATHAM.
APPARATUS FOR PHOTOGRAPHING OBJECTS IN MOTION AND FOR PROJECTING PICTURES.

No. 600,113. Patented Mar. 1, 1898.

3 Sheets—Sheet 1.

Witnesses:
Raphael Netter
Wm. C. Pinckney

Inventor
Woodville Latham
By J S M Bowen
Atty (No Model.) 3 Sheets—Sheet 2.
W. LATHAM.
APPARATUS FOR PHOTOGRAPHING OBJECTS IN MOTION AND FOR PROJECTING PICTURES.
No. 600,113. Patented Mar. 1, 1898.
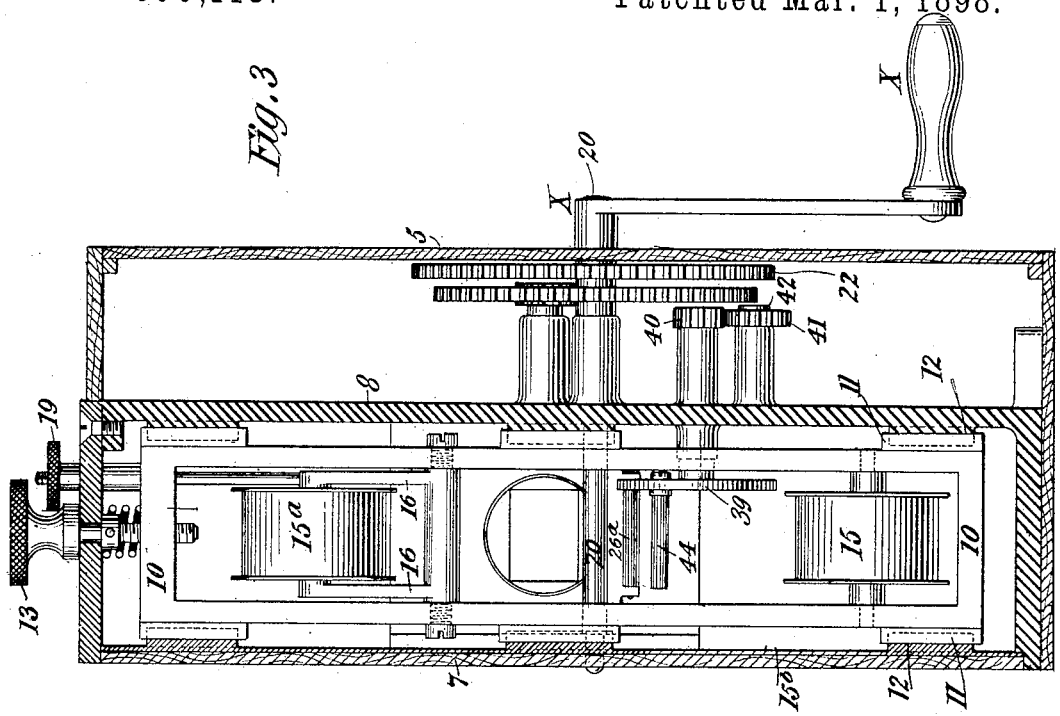
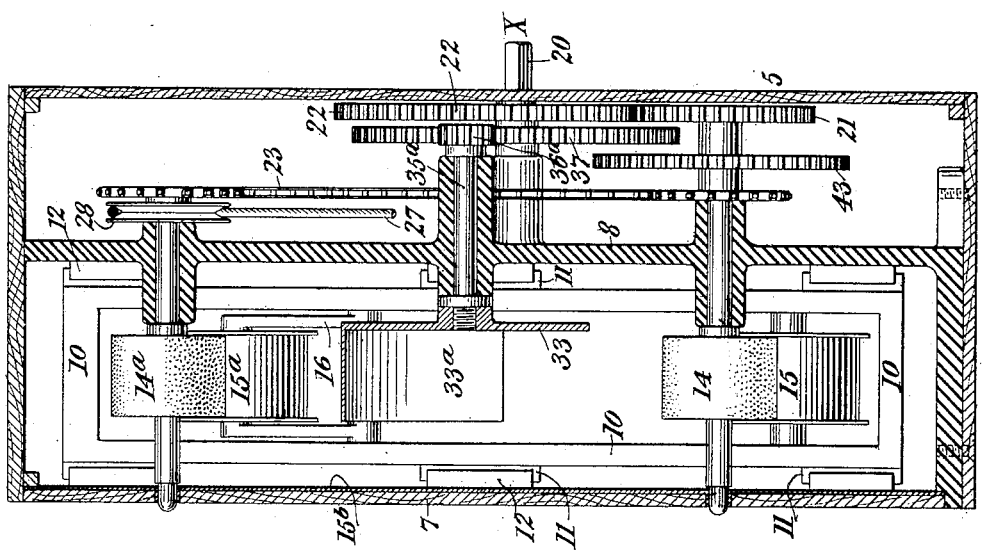
Witnesses: Inventor
Raphaël Netter Woodville Latham,
Wm. C. Pinckney By J E M Dowell
  Atty (No Model.) 3 Sheets—Sheet 3.
W. LATHAM.
APPARATUS FOR PHOTOGRAPHING OBJECTS IN MOTION AND FOR PROJECTING PICTURES.
No. 600,113. Patented Mar. 1, 1898.
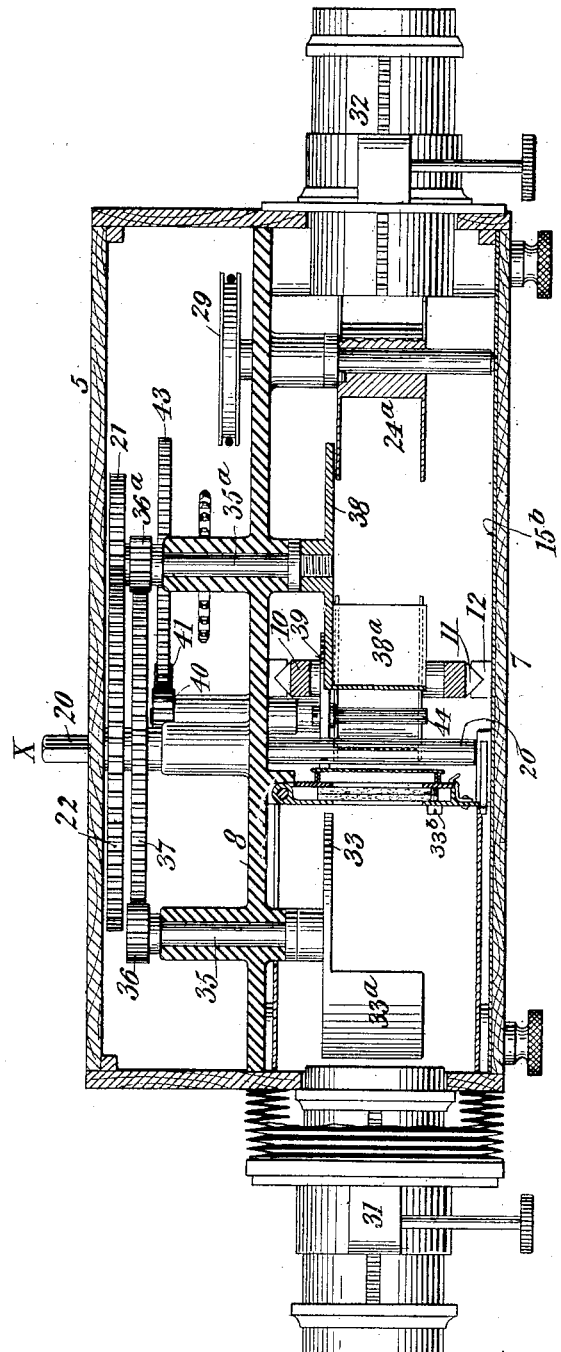
Witnesses:
Raphaël Netter
Wm. C. Pinckney
Inventor
Woodville Latham

UNITED STATES PATENT OFFICE.

WOODVILLE LATHAM, OF NEW YORK, N. Y.

APPARATUS FOR PHOTOGRAPHING OBJECTS IN MOTION AND FOR PROJECTING PICTURES.

SPECIFICATION forming part of Letters Patent No. 600,113, dated March 1, 1898.

Application filed December 26, 1896. Serial No. 617,012. (No model.)

*To all whom it may concern:*

Be it known that I, WOODVILLE LATHAM, a citizen of the United States, and a resident of New York, in the county and State of New York, have invented certain new and useful Improvements in Apparatus for Photographing Objects in Motion and for Projecting the Pictures Upon a Screen or other Surface, of which the following is a specification.

My invention relates to apparatus for photographing objects in motion and for projecting the pictures upon a screen or other surface whether by intermittent or continuous movement of the film.

The object of the invention is to devise an apparatus of the character indicated which shall be free from the defects incident to the constructions heretofore devised.

In the present apparatus smooth rollers are made use of for feeding the film. Sprocket-machines are apt to tear the picture-strip, besides being otherwise objectionable; but if the strip is carried between smooth rollers it passes through the apparatus not at the rate of a definite number of pictures per turn of the driving-shaft, as in sprocket-machines, but at the rate of a definite number of inches, and as the positive pictures usually differ in size from the negatives because of shrinkage or expansion under the process of development a new difficulty presents itself which an example will explain. Suppose that one hundred inches of celluloid film has been used and that upon it have been photographed one hundred negatives. Suppose that the negative-strip has been developed and that from it one hundred positives have been printed and developed. A measurement of the positive-strip will show that it is, I will say, only ninety-nine inches long. Let the machinery of the photographic apparatus, in connection, of course, with suitable appliances for projection, be employed to project the positives upon a screen. There will be only one exposure for each of the ninety-nine inches on which the hundred positives appear. The first projection will be that of picture number one together with a part of picture number two. The second projection will be that of the remainder of picture number two together with a larger part of picture number three. The third projection will be that of the remainder of picture number three, together with a still larger part of picture number four, and so on to the end of the strip. In the apparatus about to be described the driving-roller of each pair of feed-rollers is made of soft rubber or other yielding elastic material and the feed is suitably varied by varying the pressure between the rollers.

In the accompanying drawings, forming a part of this specification, I have shown one embodiment of my invention, the best known to me at the present time, and in the claims at the end hereof I have set forth the features and combinations for which I desire protection. It is to be understood, of course, that I do not limit myself to the particular details of arrangement or construction herein shown, as these may be varied to suit conditions.

In the drawings, in which like parts are indicated by like numerals of reference in the several views, Figure 1 is a side elevation, partly in section, of an apparatus constructed according to my invention; and Figs. 2, 3, and 4 are sections on the lines 2 2, 3 3, and 4 4, respectively, of Fig. 1.

Referring to the drawings, 5 indicates a case of any suitable dimensions and material. Each end of the case 5 is provided with a hinged door 6 6$^a$ to render the interior easy of access, and one side 7 of the case is detachably applied for the same reason.

Within case 5 is fitted and secured a frame 8, of metal, which furnishes a support and bearings for the mechanism. This frame, to reduce the weight, is cut away at suitable places, as shown at 9. A sliding frame 10 is mounted in frame 8 and guided by a series of dovetail projections 11 on its sides fitting into corresponding depressions 12 on frame 8 and the inner surface of side 7 of the case. The frame 10 is adapted to be moved up or down by turning the milled head of screw 13, which is fitted through the top of the case and engages with the top of said frame 10.

Numerals 14 14$^a$ indicate rollers covered with a proper thickness of a material that is yielding and elastic, such as soft rubber. These rollers are fixed to their shafts, which are suitably supported in frame 8 and in metallic bearings provided on the detachable side 7 of the case, the inner surface of side 7 being preferably lined with metal 15$^b$, having said bearings formed integrally therewith. 15 15$^a$ are rollers (preferably of hard material and preferably flanged, as shown) loose on their shafts. For some purposes rollers 15 15$^a$ are also made with soft facing. They are driven by the rollers 14 14$^a$. The roller 15 is mounted in the sliding frame 10 directly, while roller 15$^a$ is mounted in said frame by means of arms 16, pivoted to frame 10, as shown, and connected to the bell-crank lever 17, the long arm of which extends through a guide-piece 18 at the upper end of sliding frame 10 and out through the top of the case, where it is provided with a milled head 19. By means of the milled head 19 the bell-crank lever 17 may be turned so as to make the pressure between rollers 14$^a$ and 15$^a$ the same as the pressure between rollers 14 and 15. When these two pressures have been once equalized for any position of the frame 10, the equality will not be destroyed by moving said frame up or down and no further turning of the milled head 19 will be necessary during the operation of the apparatus.

The roller 14 is driven from the driving-shaft 20, the shaft of said roller being provided at its outer end with gear-wheel 21, which meshes with gear-wheel 22 on said driving-shaft. The roller 14$^a$ is driven from the shaft of roller 14 by suitable gearing—as, for example, a sprocket-chain 23, which answers the purpose well.

The reels carrying the film or picture-bearing strip 25 are indicated at 24 24$^a$, and they are suitably mounted in the case 5 and are easily accessible and removable. The film or picture-bearing strip is drawn from the upper reel 24 and passes between rollers 14$^a$ 15$^a$ between the pairs of small guide-rollers 26 26$^a$, located above and below the opening at the optical axis of the apparatus, thence between the rollers 14 and 15 to the lower reel 24$^a$, upon which it is wound by the action of the cord 27, which connects the shafts of roller 14$^a$ and lower reel 24$^a$ by passing over pulleys on the respective shafts. The pulley 28 on the shaft of roller 14$^a$ is provided with a groove of such shape as to prevent the slipping of the cord 27, (see Fig. 2,) and the pulley 29 on the shaft of lower reel 24$^a$ is so formed as to promote the slipping of said cord. (See Fig. 4.)

The adjustable spring-roller device 30 (shown in dotted lines in Fig. 1) serves to give the cord 27 such tension that it slips continuously on the pulley of the shaft of reel 24$^a$ to an extent sufficient to prevent the breaking of the film between the reel and the rollers 14 15, but not too much to prevent the winding of the film upon the reel regularly. This spring-roller device 30 is attached to the inside of the case in suitable relation to the cord 27 and is so constructed as to be capable of exerting by suitable adjustment the necessary amount of pressure on said cord.

There are two doors at the opening of the optical axis of the apparatus separately hinged to the supporting-frame 8, and in these doors are mounted the small guide-rollers 26 26$^a$, one pair in each door. These rollers do not quite touch each other. Between the plates supporting these guide-rollers are cemented on the side toward the objective 31 pieces of some very soft animal skin 26$^b$, with fur extending downward. On the side toward the objective 32 are cemented pieces of velvet, felt, or similar substance 26$^c$. The fur brushes without injury the sensitive side of the film as the latter moves downward. When the film is to be transferred from the lower to the upper reel, the outer door is opened to prevent raking of the sensitive surface. When the two doors are shut together, these cemented pieces press against each other, so that the film 25 passes between them with suitable friction. A regulating-screw 33$^b$, operating between the two doors, makes it possible to vary the friction to suit films of varying thickness. The objective 31 is the one employed for photographing. It and its bellows are detachably connected to the case and are to be removed, as are also the shutter 33 and its inclosing box and the cap 34$^a$, back of the opening at the optical axis, when the apparatus is used for projecting.

The shutter 33 comprises a disk, from which projects perpendicularly the "guillotine-shutter" proper, 33$^a$, which may be curved, as shown, or it may be flat. The advantage claimed for this shutter is that it alternately cuts up and down, and that the defects due to an upward-cutting exposure and those due to a downward-cutting exposure in photographing the pictures neutralize each other when the pictures are rapidly projected, and that the effect of a uniform exposure is thereby produced.

The shutter 33, which is made use of when photographing, is mounted in a box 34 on a shaft 35, having bearings in frame 8, but not extending into the box 34. This box is open toward the objective 31 and toward the film 25 on the opposite side, and it fits well against the inside of door 6$^a$ or against the bellows of the objective 31, if the door is not present, and against the outer one of the two small doors in which the guide-rollers 26 26$^a$ are mounted.

The outer end of the shaft 35 of shutter 33 is provided with a pinion 36, which is adapted to mesh with gear-wheel 37, fixed to the driving-shaft 20, by which means the desired movement is communicated to the shutter.

The shutter 38 38$^a$ may or may not be made use of when projecting; but it is preferably used when the film moves intermittently and must be used when the film moves continuously. It is the same as shutter 33 33$^a$ (except as to the time of exposure it allows) and is similarly mounted in frame 8 in proper relation to the opening in the optical axis of the apparatus, as seen in Fig. 1. It also has the necessary movement communicated to it from the gear 37 on the driving-shaft 20, which gear meshes with a pinion 36ª on the end of shaft 35ª of said shutter.

The cap 34ª fits upon a projection on the rear door at the optical axis. It is easily removable and its purpose is to prevent the light through the objective 31 at the moment of exposure from reaching any part of the film except that on which the picture is to be photographed.

A disk 39 is mounted below the optical axis in proper relation to the rollers 14 15 and moves in the same plane with them, its shaft having bearings in the frame 8 and carrying at its outer end a pinion 40, which meshes with a gear 41 on shaft 42, the gear 41 in turn meshing with gear 43 on the shaft of roller 14. By this arrangement of the gearing the proper direction of movement is given to the disk 39. Perpendicular to the face of the disk 39 is mounted a rod or tube 44, which is adjustable in a slot in said disk (see Fig. 1) to different distances from the center of the disk. During a part of the time of a revolution of disk 39 its rod or tube 44 presses on the film 25 and draws a portion of it down between the doors at the optical axis of the apparatus. The portion drawn down at any one contact of the rod or tube with the film is precisely equal to what the rollers 14 15 have moved forward since the preceding contact. This fact should be marked carefully, because it is the keynote of the apparatus and because it seems not to have been observed heretofore. If the rod or tube 44 is so near to the center of disk 39 that it pulls down less of the film than the rollers 14 15 move forward in the intervals of contact between said rod or tube and the film, then in the intervals of contact the film will be broken or else will be drawn between the small doors at the optical axis by the rollers 14 15 and there will be no rest of the film at the optical axis at the times of exposure. If, on the other hand, the rod or tube 44 is so far from the center of the disk 39 that its first impact with the film draws down a greater length than the rollers 14 15 take up in the interval between the impacts, the fault is corrected at the second impact, and ever afterward the length of film brought down by the rod or tube 44 will depend solely on what the roller 14 in a revolution against the roller 15 can carry forward. The ratio of the time of movement of the film to the time of rest depends on the number of degrees of revolution which rod or tube 44 makes while it is pressing upon the film. Increase of the distance of the shaft of the disk 39 from the taut film between the rollers 26ª and the rollers 14 15 (coupled with a suitable increase of the distance of rod or tube 44 from the center of 39) will increase the time of rest and diminish the time of movement. If the center of the disk is placed on the side of the film opposite to that where it appears in the drawings, the disk may be of smaller diameter. These facts must be considered in constructing the machine to suit varying conditions.

When the apparatus is to be used for photographing, the objective 31 and its bellows and the shutter 33 33ª and its box 34 are placed in position and the cap 34ª is put in its place. All the rest of the apparatus is covered by the case 5. The milled head 13 is turned to move the frame 10, so as to give fair pressure between the rollers 14 15 and between the rollers 14ª 15ª. Let it be supposed that the rollers 14 14ª are of such diameters that when they revolve once six inches of film are carried forward, and let it be supposed that the gearing between roller 14 and the disk 39 is such that one revolution of the roller 14 makes six revolutions of the disk 39. When the negatives have been photographed, it will be found that each of them occupies one inch of film. The negatives are developed, the positives are printed and developed, and the pictures are now ready to be projected. In projecting the pictures the objective 31, the shutter 33 33ª, and the cap 34ª, covering the optical axis, are removed, and a lamp and condenser are placed near about where the said objective and shutter were previously placed, the objective 32 being already in position. The shutter 38 38ª may be used or not in the projection. Both of the shutters are readily removable. Now as the film begins to run through the apparatus (a slack portion being provided just below rollers 14ª 15ª, as seen at x, Fig. 1) it may be found that the pictures, because of the circumstance that each of them may occupy greater or less than one inch of the film, (due to development, as herein explained,) do not present themselves with their centers at the optical axis at the moments of exposure, because the rollers 14 15 and 14ª 15ª feed too slowly or too rapidly. A turn of the milled head 13 in the proper direction will cause a greater or less pressure between the pairs of rollers and so diminish or increase the effective diameter and carrying-surface of the rollers 14 14ª, and the result will be a proper presentation of the pictures. The slightest tendency to false projection can be seen by the operator as he watches the upper or lower margin of the pictures on the screen, and before the spectators have had opportunity to observe any defect he obviates it. If the pictures are of substantially uniform size, it is unnecessary to touch the milled head 13 after they have begun to present themselves properly. With projection made by my improvements there is no dancing up and down of the pictures, (no quiver,) and the appearance is as natural as a limited number of repeated impressions on the eye can ever be as compared with a continuous impression coming of an uninterrupted stream of light from the objects looked at.

For scientific purposes this apparatus is the only one of which I have any knowledge that is capable of giving anything like accurate results.

An operative apparatus, as illustrated and described, is very compact and light and can therefore be carried about by hand. A surveyor's tripod answers well to rest it upon. It can be actuated by means of the crank X, (shown in Fig. 3,) or, if more convenient, a pulley can be attached to the driving-shaft 20 and any form of motor employed to run the apparatus.

By removing the disk 39 the apparatus may be employed to project pictures (and to photograph them, though not so well as with the disk) without stopping the film at the moment of exposure.

When the apparatus is constructed to project pictures only, its size may be reduced, as no parts of the photographing appliances are needed.

It is obvious that the reel 24 and the rollers 14$^a$ 15$^a$, with the regulating device belonging to them, might be dispensed with and the picture-strip be drawn around the lamp from a box or basket placed under the table or that the picture-strip may be put into the form of an endless band. In this case the loop 25 would be unnecessary.

Having thus described my invention, what I claim as new, and desire to secure by Letters Patent, is—

1. The combination with an objective, of a proper guide adapted to conduct a film across the optical axis of the same, two smooth-surfaced rollers between which said film is drawn past the objective, one of said rollers driving the other and having a yielding surface, and means for adjusting the pressure between said rollers.

2. The combination with an objective, of guides adapted to conduct a strip or film past the same, a pair of smooth-faced feed-rollers, one of said rollers being made of yielding and elastic material, appliances for regulating the pressure between said rollers, a shutter, a revolving disk provided with a rod perpendicular to its face and adjustable from the center to the circumference of the disk, and suitable gearing for propelling the movable parts of the apparatus.

3. The combination with an objective, of guides for conducting a strip or film past the same, a pair of smooth-surfaced feed-rollers for said film, one of said rollers being made of yielding and elastic material, appliances for regulating the pressure between said rollers, a dark box in proper relation to the objective and the optical axis, a shutter adapted to revolve in said dark box, a disk revolubly mounted and provided with a rod perpendicular to its face and adjustable from the center to the circumference of the disk, and suitable gearing for actuating the moving parts of the apparatus.

4. The combination with an objective, of a pair of smooth-surfaced feed-rollers adapted to draw a strip or film past the objective, one of said rollers being made of yielding or elastic material, means for regulating the pressure between said rollers, a revolving guillotine-shutter, and suitable gearing for operating the movable parts of the apparatus.

5. As a means for regulating the movement of a film, the combination with a pair of rollers and suitable guides all adapted to conduct a strip or film, of a rod revolubly mounted on a shaft parallel with said rod and adapted to engage with said film between said guides and said pair of rollers, means for varying the distance between said rod and its shaft, and gearing for actuating the movable parts of the apparatus.

6. An apparatus of the character herein described comprising delivering and receiving reels adapted to carry a strip or film, two pairs of smooth-surfaced feed-rollers for said film, one roller of each pair of yielding and elastic material and the other roller of each pair of suitable material, appliances for regulating the pressure between the respective rollers of each pair to make the feed of the two pairs together greater or less as may be necessary, a shutter, a photographic objective and suitable gearing for giving the necessary movements to said reels, feed-rollers and shutter.

7. The combination with delivering and receiving reels adapted to carry a strip or film, of two pairs of smooth-surfaced feed-rollers for said film, one roller of each pair of yielding and elastic material and the other roller of each pair of suitable material, appliances for adjusting the pressure between the two rollers of one pair and for regulating the pressure between the respective rollers of each pair to make the feed of the two pairs together greater or less as may be necessary, a shutter, a photographic objective and suitable gearing for giving the necessary movements to said reels, feed-rollers and shutter.

8. The combination with delivering and receiving reels adapted to carry a strip or film, of two pairs of smooth-surfaced feed-rollers for said film, one roller of each pair of yielding and elastic material and the other roller of each pair of suitable material, appliances for regulating the pressure between the respective rollers of each pair to make the feed of the two pairs together greater or less as may be necessary, guide-rollers for the film above and below the optical axis, a photographic objective, a dark box in proper relation to the objective and the optical axis, a shutter adapted to revolve in said dark box, and suitable gearing for giving the necessary movements to said reels, feed-rollers and shutter.

9. The combination with delivering and receiving reels adapted to carry a strip or film, of two pairs of smooth-surfaced feed-rollers for said film, one roller of each pair of yielding and elastic material and the other roller of each pair of suitable material, appliances for regulating the pressure between the respective rollers of each pair to make the feed of the two pairs together greater or less as may be necessary, a shutter, a disk intermediate the two pairs of said feed-rollers and adapted to revolve in the same plane as said feed-rollers, and provided with a rod or tube perpendicular to its face and adjustable from the center to the circumference of the disk, a photographic objective and suitable gearing for giving the necessary movements to said reels, feed-rollers, disk and shutter.

10. The combination with delivering and receiving reels adapted to carry a strip or film, of two pairs of smooth-surfaced feed-rollers for said film, one roller of each pair of yielding and elastic material and the other roller of each pair of suitable material, appliances for regulating the pressure between the respective rollers of each pair to make the feed of the two pairs together greater or less as may be necessary, guide-rollers for the film above and below the optical axis, a photographic objective, a dark box in proper relation to the objective and the optical axis, a shutter adapted to revolve in said dark box, a disk intermediate of the two pairs of said feed-rollers and adapted to revolve in the same plane as said feed-rollers and provided with a rod or tube perpendicular to its face and adjustable from the center to the circumference of the disk, and suitable gearing for giving the necessary movements to said reels, feed-rollers, disk and shutter.

11. The combination with delivering and receiving reels adapted to carry a strip or film, of two pairs of smooth-surfaced feed-rollers for said film, one roller of each pair of yielding and elastic material and the other roller of each pair of suitable material, appliances for regulating the pressure between the respective rollers of each pair to make the feed of the two pairs greater or less as may be necessary, a revolving guillotine-shutter, a photographic objective and suitable gearing for giving the necessary movements to said reels, feed-rollers and shutter.

12. The combination with delivering and receiving reels adapted to carry a strip or film, of two pairs of smooth-surfaced feed-rollers for said film, one roller of each pair of yielding and elastic material and the other roller of each pair of suitable material, appliances for regulating the pressure between the respective rollers of each pair to make the feed of the two pairs greater or less as may be necessary, a revolving curved guillotine-shutter, a photographic objective and suitable gearing for giving the necessary movements to said reels, feed-rollers and shutter.

13. In an apparatus of the character herein described, the combination with delivering and receiving reels adapted to carry a picture-strip or film, of two pairs of smooth-surfaced feed-rollers for said picture-strip, one roller of each pair of yielding and elastic material and the other roller of each pair of suitable material, appliances for regulating the pressure between the respective rollers of each pair to make the feed of the two pairs together greater or less as may be necessary to bring the center of each picture to the optical axis at the moment of exposure, a shutter in proper relation to the optical axis, an objective, and suitable gearing for giving the necessary movements to said reels, feed-rollers and shutter.

14. The combination with delivering and receiving reels adapted to carry a picture-strip or film, of two pairs of smooth-surfaced feed-rollers for said picture-strip, one roller of each pair of yielding and elastic material and the other roller of each pair of suitable material, appliances for adjusting the pressure between the two rollers of one pair and for regulating the pressure between the respective rollers of each pair to make the feed of the two pairs together greater or less as may be necessary to bring the center of each picture to the optical axis at the moment of exposure, a shutter in proper relation to the optical axis, an objective, and suitable gearing for giving the necessary movements to said reels, feed-rollers and shutter.

15. The combination with delivering and receiving reels adapted to carry a picture-strip or film, of two pairs of smooth-surfaced feed-rollers for said picture-strip, one roller of each pair of yielding and elastic material and the other roller of each pair of suitable material, appliances for regulating the pressure between the respective rollers of each pair to make the feed of the two pairs together greater or less as may be necessary to bring the center of each picture to the optical axis at the moment of exposure, a disk intermediate of the two pairs of said feed-rollers and adapted to revolve in the same plane as said feed-rollers, and provided with a rod or tube perpendicular to its face and adjustable from the center to the circumference of the disk, an objective, and suitable gearing for giving the necessary movements to said reels, disk and feed-rollers.

16. The combination with delivering and receiving reels adapted to carry a picture-strip or film, of two pairs of smooth-surfaced feed-rollers for said picture-strip, one roller of each pair of yielding and elastic material and the other roller of each pair of suitable material, appliances for regulating the pressure between the respective rollers of each pair to make the feed of the two pairs together greater or less as may be necessary to bring the center of each picture to the optical axis at the moment of exposure, a disk intermediate of the two pairs of said feed-rollers and adapted to revolve in the same plane as said feed-rollers, and provided with a rod or tube perpendicular to its face and adjustable from the center to the circumference of the disk, a shutter in proper relation to the optical axis, an objective, and suitable gearing for giving the necessary movements to said reels, feed-rollers, disk and shutter.

17. The combination with delivering and receiving reels adapted to carry a picture-strip or film, of two pairs of smooth-surfaced feed-rollers for said picture-strip, one roller of each pair of yielding and elastic material and the other roller of each pair of suitable material, appliances for regulating the pressure between the respective rollers of each pair to make the feed of the two pairs together greater or less as may be necessary to bring the center of each picture to the optical axis at the moment of exposure, a revolving guillotine-shutter in proper relation to the optical axis, an objective and suitable gearing for giving the necessary movements to said reels, feed-rollers and shutter.

18. As a means for increasing or diminishing the speed of a film or belt, or for varying the relative rates of revolution of two shafts, the differential frictional gearing herein described consisting of a smooth-surfaced roller of any suitable material coöperating with a smooth-surfaced roller of yielding and elastic material, and appliances for adjusting the pressure between said rollers.

19. In combination, a supporting-frame, two feed-rollers of yielding and elastic material, a sliding frame, as 10, and two smooth-surfaced feed-rollers of suitable material carried by said sliding frame in proper relation to said first-mentioned feed-rollers, so as to form pairs of feed-rollers, and appliances for regulating the pressure between the respective rollers of each pair to make the feed of the two pairs together greater or less as may be necessary.

20. In combination, a supporting-frame, two feed-rollers of yielding and elastic material, a sliding frame, as 10, and two smooth-surfaced feed-rollers of suitable material carried by said sliding frame in proper relation to said first-mentioned feed-rollers, so as to form pairs of feed-rollers, and appliances for adjusting the pressure between the two rollers of one pair and for regulating the pressure between the respective rollers of each pair to make the feed of the two pairs together greater or less as may be necessary.

21. The combination with the delivering and receiving reels adapted to carry the film, and the feed-rollers one of which being of yielding and elastic material and the other of any suitable material and adapted to be pressed against the yielding and elastic roller to compress it more or less as may be required during the operation of the apparatus, of a pulley on the shaft of the receiving-reel formed to promote slipping of a driving-cord, a pulley on the shaft of one of the feed-rollers formed to prevent slipping of such cord, and a driving-cord passing over said pulleys, whereby the movement of the receiving-reel is regulated to permit the film to wind itself upon said receiving-reel regularly and without chance of breaking.

22. The combination with the delivering and receiving reels adapted to carry the film, and the feed-rollers one of which being of yielding and elastic material and the other of any suitable material and adapted to be pressed against the yielding and elastic roller to compress it more or less as may be required during the operation of the apparatus, of a pulley on the shaft of the receiving-reel formed to promote slipping of a driving-cord, a pulley on the shaft of one of the feed-rollers formed to prevent slipping of such cord, a driving-cord passing over said pulleys and an adjustable spring-roller to increase or diminish the tension of said cord, whereby the film is caused to wind itself upon the receiving-reel regularly and with safety.

Signed at New York, in the county and State of New York, this 22d day of December, 1896.

WOODVILLE LATHAM.

Witnesses:
J. E. M. BOWEN,
ALEXIS C. SMITH.